(12) United States Patent
Gupta et al.

(10) Patent No.: US 9,210,538 B2
(45) Date of Patent: Dec. 8, 2015

(54) METHOD, SYSTEM, AND COMPUTER-READABLE MEDIUM FOR PROVIDING LOCATION-BASED LISTING SERVICES

(75) Inventors: Puneet Gupta, Bangalore (IN); Akshay Darbari, Allahabad (IN); Venkat Kumar Sivaramamurthy, Bangalore (IN)

(73) Assignee: Infosys Limited, Bangalore (IN)

(*) Notice: Subject to any disclaimer, the term of this patent is extended or adjusted under 35 U.S.C. 154(b) by 291 days.

(21) Appl. No.: 13/425,849

(22) Filed: Mar. 21, 2012

(65) Prior Publication Data
US 2012/0258736 A1 Oct. 11, 2012

(30) Foreign Application Priority Data
Apr. 7, 2011 (IN) .......................... 1210/CHE/2011

(51) Int. Cl.
H04W 24/00 (2009.01)
H04W 4/02 (2009.01)
H04W 4/00 (2009.01)
H04W 64/00 (2009.01)

(52) U.S. Cl.
CPC ................ *H04W 4/02* (2013.01); *H04W 4/001* (2013.01); *H04W 64/00* (2013.01)

(58) Field of Classification Search
CPC ....... H04W 4/02; H04W 4/021; H04W 4/022; H04W 4/023; H04W 4/025–4/028; H04W 4/06

USPC ............................................... 455/456.1–457
See application file for complete search history.

(56) References Cited

U.S. PATENT DOCUMENTS

| | | | |
|---|---|---|---|
| 6,480,861 B1* | 11/2002 | Kanevsky et al. | 1/1 |
| 2002/0111172 A1* | 8/2002 | DeWolf et al. | 455/456 |
| 2003/0088463 A1* | 5/2003 | Kanevsky et al. | 705/14 |
| 2004/0259534 A1* | 12/2004 | Chaudhari et al. | 455/414.1 |
| 2008/0098459 A1* | 4/2008 | Banga et al. | 726/3 |
| 2009/0011781 A1* | 1/2009 | Merrill et al. | 455/466 |
| 2010/0082241 A1* | 4/2010 | Trivedi | 701/208 |
| 2011/0053618 A1* | 3/2011 | Lin et al. | 455/466 |
| 2012/0010938 A1* | 1/2012 | Standley et al. | 705/14.36 |

* cited by examiner

*Primary Examiner* — San Htun
(74) *Attorney, Agent, or Firm* — Marc S. Kaufman; Mark T. Vogelbacker; Reed Smith LLP

(57) ABSTRACT

The present invention relates to a computer-implemented method, system and computer readable medium for providing context-based listing services. The method comprises registering at least one first service provider with an second service provider wherein registering comprises that the first service provider provides the information via a communication network to the second service provider and it validates the information. Validating comprises identify the location of the first service provider and/or request to at least one predefined user located nearby the location of the first service provider. At least one user requests the second service provider for the information via the communication network. At least one user retrieves the information and provides ranking to category of services so as to update the information in the second service provider.

18 Claims, 4 Drawing Sheets

METHOD, SYSTEM, AND COMPUTER-READABLE MEDIUM FOR PROVIDING LOCATION-BASED LISTING SERVICES

RELATED APPLICATION DATA

This application claims priority to Indian Patent Application No. 1210/CHE/2011, filed Apr. 7, 2011, which is hereby incorporated by reference in its entirety.

FIELD OF THE INVENTION

The present invention relates to the field of location-based services in general. In particular, the present invention provides a computer-implemented method, system and computer readable medium for providing context-based listing services.

BACKGROUND OF THE INVENTION

The existing process deployed by Location based listing services organizations involve actual involvement of field agent on ground to collect the location co-ordinates and the address information which is latter populated in their databases for end user access. This existing process is manual and involves both cost and time.

Thus, there is a need to overcome the problems of the existing technology. Therefore, the present inventors have developed a computer-implemented method, system and computer-readable medium for providing context-based listing services which would provide a location based listing services with the community involvement to reduce the cost and time of deployment of listing services.

SUMMARY OF THE INVENTION

According to one aspect of the invention there is provided a computer implemented method executed by one or more computing devices for providing context-based listing services. The method comprises registering at least one first service provider, by at least one of the computing devices, with a second service provider wherein the registering comprises providing an information to the second service provider via a communication network by the first service provider wherein the information comprises at least one category of service provided by the at least one first service provider and/or a location of the first service provider and/or a duration of availability of the category of service, and validating the information by the second service provider wherein the validating comprises identifying the location of the first service provider and/or requesting to at least one predefined user located nearby the location of the first service provider to provide a confirmation of the information to the second service provider. Requesting, by at least one of the computing devices, the second service provider for the information via the communication network by at least one user. Retrieving, by at least one of the computing devices, the information by at least one the user wherein the retrieving comprises identifying a location of the user and/or at least one the user profile and/or at least one the category of service provided in the at least one second service provider and/or the duration of availability of the category of service and/or a feedback provided by at least one user; and providing, by at least one of the computing devices, a ranking of at least one the category of service to the second service provider by at least one the user so as to update the information provided in the second service provider.

According to another aspect of the invention there is provided a system for providing context-based listing services. The system comprises a memory, and a processor operatively coupled to the memory. The processor configured to perform the steps of registering at least one first service provider, by at least one of the computing devices, with a second service provider wherein the registering comprises providing an information to the second service provider via a communication network by the first service provider wherein the information comprises at least one category of service provided by the at least one first service provider and/or a location of the first service provider and/or a duration of availability of the category of service, and validating the information by the second service provider wherein the validating comprises identifying the location of the first service provider and/or requesting to at least one predefined user located nearby the location of the first service provider to provide a confirmation of the information to the second service provider. Requesting, by at least one of the computing devices, the second service provider for the information via the communication network by at least one user. Retrieving, by at least one of the computing devices, the information by at least one the user wherein the retrieving comprises identifying a location of the user and/or at least one the user profile and/or at least one the category of service provided in the at least one second service provider and/or the duration of availability of the category of service and/or a feedback provided by at least one user; and providing, by at least one of the computing devices, a ranking of at least one the category of service to the second service provider by at least one the user so as to update the information provided in the second service provider.

According to another aspect of the invention there is provided a Computer-readable code stored on a non-transitory computer-readable medium that, when executed by a computing device, performs a method for providing context-based listing services. The method comprises registering at least one first service provider, by at least one of the computing devices, with a second service provider wherein the registering comprises providing an information to the second service provider via a communication network by the first service provider wherein the information comprises at least one category of service provided by the at least one first service provider and/or a location of the first service provider and/or a duration of availability of the category of service, and validating the information by the second service provider wherein the validating comprises identifying the location of the first service provider and/or requesting to at least one predefined user located nearby the location of the first service provider to provide a confirmation of the information to the second service provider. Requesting, by at least one of the computing devices, the second service provider for the information via the communication network by at least one user. Retrieving, by at least one of the computing devices, the information by at least one the user wherein the retrieving comprises identifying a location of the user and/or at least one the user profile and/or at least one the category of service provided in the at least one second service provider and/or the duration of availability of the category of service and/or a feedback provided by at least one user; and providing, by at least one of the computing devices, a ranking of at least one the category of service to the second service provider by at least one the user so as to update the information provided in the second service provider.

BRIEF DESCRIPTION OF THE DRAWINGS

Features, aspects, and advantages of the present invention will be better understood when the following detailed description is read with reference to the accompanying drawings in which like characters represent like parts throughout the drawings, wherein.

DETAILED DESCRIPTION OF THE INVENTION

While system and method are described herein by way of example and embodiments, those skilled in the art recognize that system and method for providing context-based listing services are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA." It is worth noting that the present discussion relates to exemplary embodiments, and the appended claims should not be limited to the embodiments discussed herein.

Figure 1:
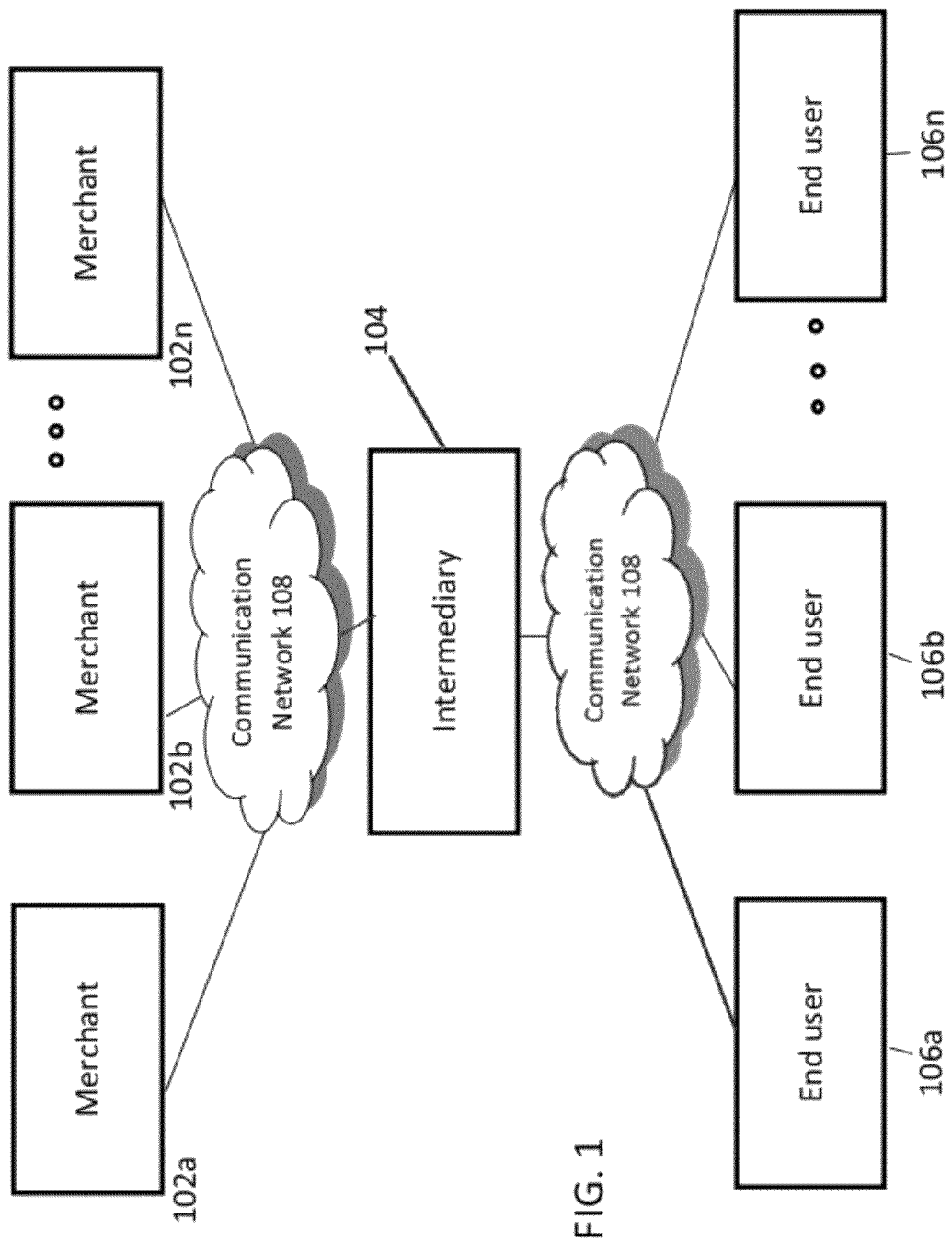
FIG. 1 shows an environment in which the present invention can be practiced in accordance with an embodiment of the present invention.

FIG. 1 shows an environment in which the present invention can be practiced, in accordance with an embodiment of the present invention. FIG. 1 includes a plurality of merchants (first service providers) 102*a*, 102*b*, . . . , 102*n*, an intermediary (a second service provider) 104, and a plurality of end users 106*a*, 106*b*, . . . , 106*n* and a communication network 108. Merchants 102*a*, 102*b*, . . . , 102*n* may hereinafter be collectively referred to as merchant 102. Likewise, end users 106*a*, 106*b*, . . . , 106*n* may hereinafter be collectively referred to as end user 106.

When merchant (first service provider(s)) 102 wants to register information regarding his/her shop and available services with intermediary (a second service provider) 104, the merchant sends the information to the intermediary (second service provider) 104 via a communication network (108). On receiving this information, the intermediary (the second service provider) 104 identifies the location of the merchant and adds the information provided by merchant (first service provider(s)) 102 along with the identified location to a database (not shown in the figure). Intermediary 104 requests a set of end users to validate the information provided by merchant 102 and to provide feedback on a set of parameters. Based on the validation and the feedback, intermediary 104 updates the database. When end user 106 wants information regarding a particular service (or a shop), the end user requests intermediary 104 for the information via a communication network 108. Intermediary 104 checks the database and provides the information taking into account the feedback provided by various end users. Further, intermediary 104 may also identify the location of end user 106 and provide additional information based on the identified location. For example, if end user 106 requests for the address of a restaurant in a particular location, intermediary 104 checks the database and provides the address of the restaurant. Further, based on the location of end user 106, intermediary 104 may also provide a list of all restaurants present in the vicinity to end user 106 through a communication network 108.

In accordance with an embodiment of the present invention, in order to validate the information sent by merchant (first service provider(s)) 102 at the time of registration, the intermediary (the second service provider) 104 first identifies the location of the merchant. Intermediary 104 then determines whether any end users are present in the vicinity of the identified location. In case any end users are present in the vicinity, intermediary 104 asks the end users to provide a confirmation on the information sent by the merchant. The end user may be a predefined user having a predefined agreement with the service provider. The end users may verify the presence of the shop and/or offered services and send a confirmation to intermediary 104. For example, if the merchant owns a restaurant and registers the details of the restaurant with intermediary 104, intermediary 104 asks a set of end users to confirm the details. Further, intermediary 104 may also ask the end users to provide their feedback (i.e. provide ranking of category of services) on various parameters concerning the restaurant, such as quality of the food served in the restaurant, hygiene, ambience, and so forth.

Intermediary (second service provider) 104 then updates the database accordingly. When an end user requests intermediary 104 for a list of restaurants available in his/her vicinity, intermediary 104 prioritizes the list of restaurants available, based on the feedback submitted by the end users regarding each restaurant. In accordance with en example, intermediary 104 may maintain profiles of the end users, which may also be used to prioritize the list of restaurants available. The user profile comprises a name, an address, an income, and an age. That is, intermediary 104 may use profile information of the end users while providing the required information to the end users.

In accordance with various embodiments of the present invention, merchant 102 may be any vendor wishing to sell goods/services to users, such as end user 106. Further, merchant (first service provider(s)) 102 may have an establishment, such as an office or a shop and a communication device, using which the merchant sends the information to intermediary 104. Likewise, end user 106 may be any user who has a communication device and needs information. The communication network 108 used by the merchant and the end user may be any of interactive voice response (IVR), a short messaging service (SMS), unstructured supplementary services data (USSD), data channel and so forth. The communication device may be any of a mobile device, a fixed telephone, and so forth.

Intermediary (second service provider) 104 may identify the location of merchants and end users by using any technique such as, for example, global positioning system (GPS), by identifying the base station servicing the user, or any other technique known in the art. Intermediary (second service provider) 104 may be any entity that maintains records of end users, such as, for example, a telecom operator.

The information sent by the merchant includes various details such as name of the merchant, contact number, address of the merchant's shop, types of services/goods provided, location of the shop and the like. Intermediary 104 updates the database with all these details. Further, as explained earlier, intermediary 104 also requests for confirmation regarding the location of the shop from end users who are in the vicinity of the location. The end user may be a predefined user having a predefined agreement with the service provider. Once intermediary 104 receives the confirmation, it provides this data to any end user who requests for information from intermediary 104. It should be noted that merchants and end users must subscribe with the intermediary to send information and receive requested details respectively. Further, merchant (first service provider(s)) 102 may send updated information to intermediary 104 at any point in time. Intermediary 104 gets the information validated by the end users and updates its database accordingly. For example, if merchant 102 has moved his shop to a new location or has shut down his shop, merchant 102 may provide this information to intermediary 104. Intermediary 104 may then update its database with the new information accordingly.

Figure 2:
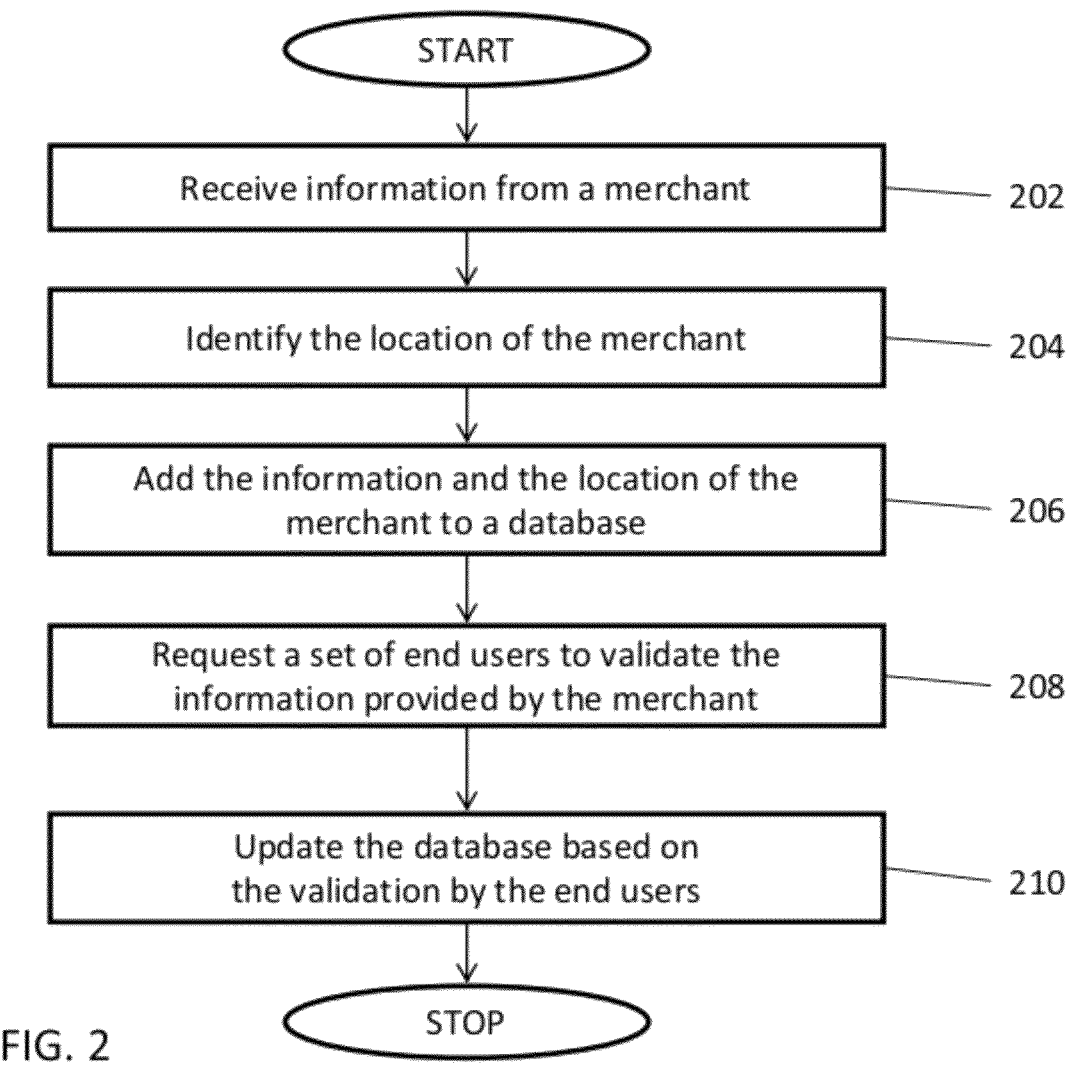
FIG. 2 is a flow chart depicting a method for providing location-based listing services, in accordance with an embodiment of the present invention.

FIG. 2 is a flow chart depicting a method for providing location-based listing services, in accordance with an embodiment of the present invention. At step 202, an intermediary, such as intermediary (second service provider) 104, receives a first set of information from a merchant, such as merchant (first service provider(s)) 102, who wishes to register his/her services with the intermediary. In accordance with various embodiments of the present invention, the first set of information includes name of the merchant, contact number, address of the merchant's shop, types of services/goods provided, location of the shop and the like. On receiving this information, at step 204, the intermediary identifies the location of the merchant using known techniques, such as, for example, global positioning system (GPS). At step 206, the intermediary adds the information provided by the merchant to a database. At step 208, the intermediary requests a set of end users to validate the information provided by the merchant. Further, the intermediary may also request the end users to provide their feedback on various parameters regarding the services/goods provided by the merchant. At step 210, the intermediary updates the database based on the validation performed by the end users and their feedback.

Figure 3:
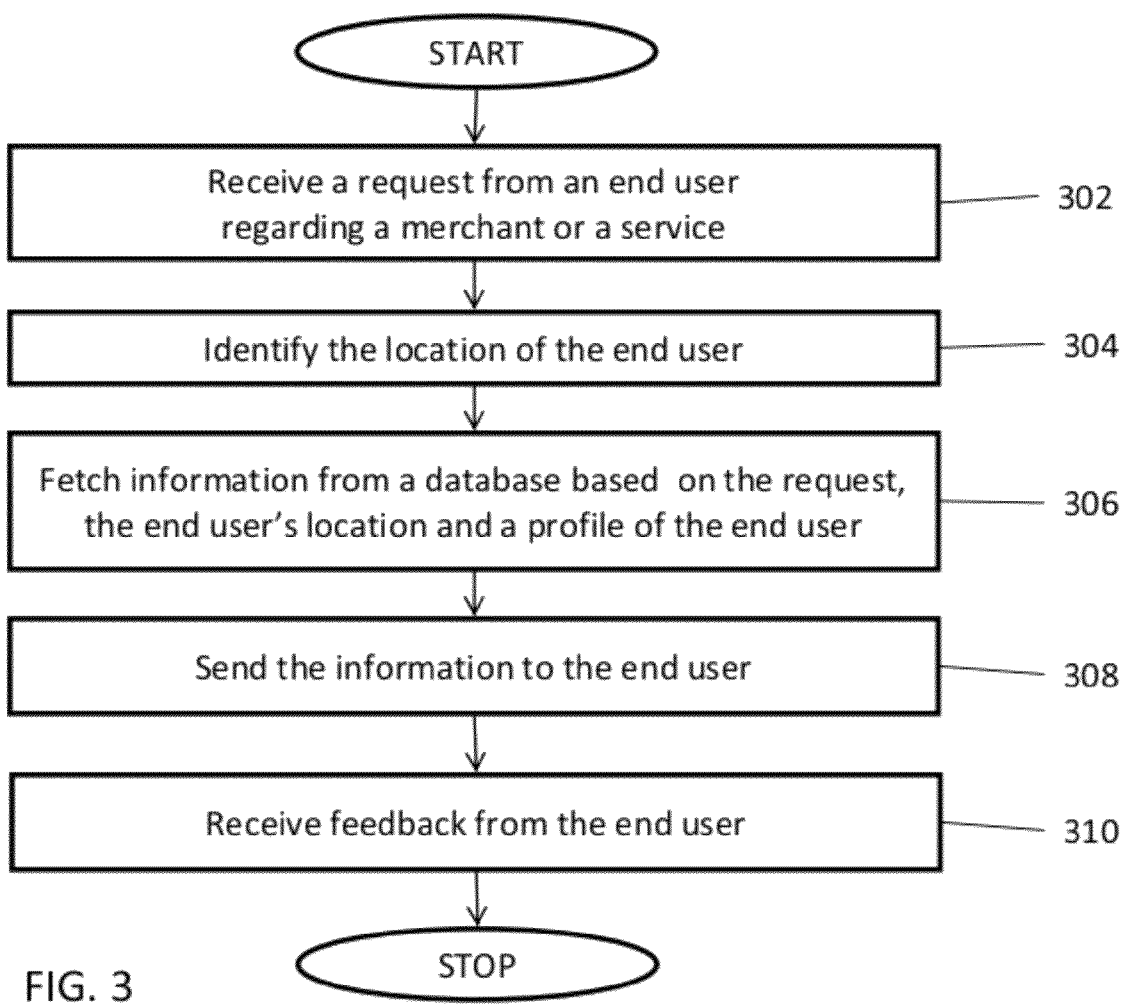
FIG. 3 is a flow chart illustrating a method for providing information to end users, in accordance with an embodiment of the present invention.

FIG. 3 is a flow chart illustrating a method for providing information to end users, in accordance with an embodiment of the present invention. At step 302, an intermediary, such as intermediary (second service provider) 104, receives a request from an end user regarding a merchant or a service. At step 304, the intermediary identifies the location of the end user from whom the request was received. At step 306, the intermediary checks a database and fetches details of merchants that provide the service desired by the user. The intermediary may take into account the feedback provided by various end users regarding the merchant or the service while providing the information desired by the end user. The intermediary may also take into account the profile of the end user, which is maintained by the intermediary. At step 308, the intermediary provides a second set of information, which includes details of the merchants (prioritized on the basis of the feedback received from the end users) that may be closest to the current location of the user. Further, the intermediary may provide relevant advertisements to the user along with this information. At step 310, the intermediary receives feedback from the end user regarding the information sent by the intermediary to the end user. It should be noted that step 310 is an optional step, which need not be performed always.

Exemplary Computing Environment

Figure 4:
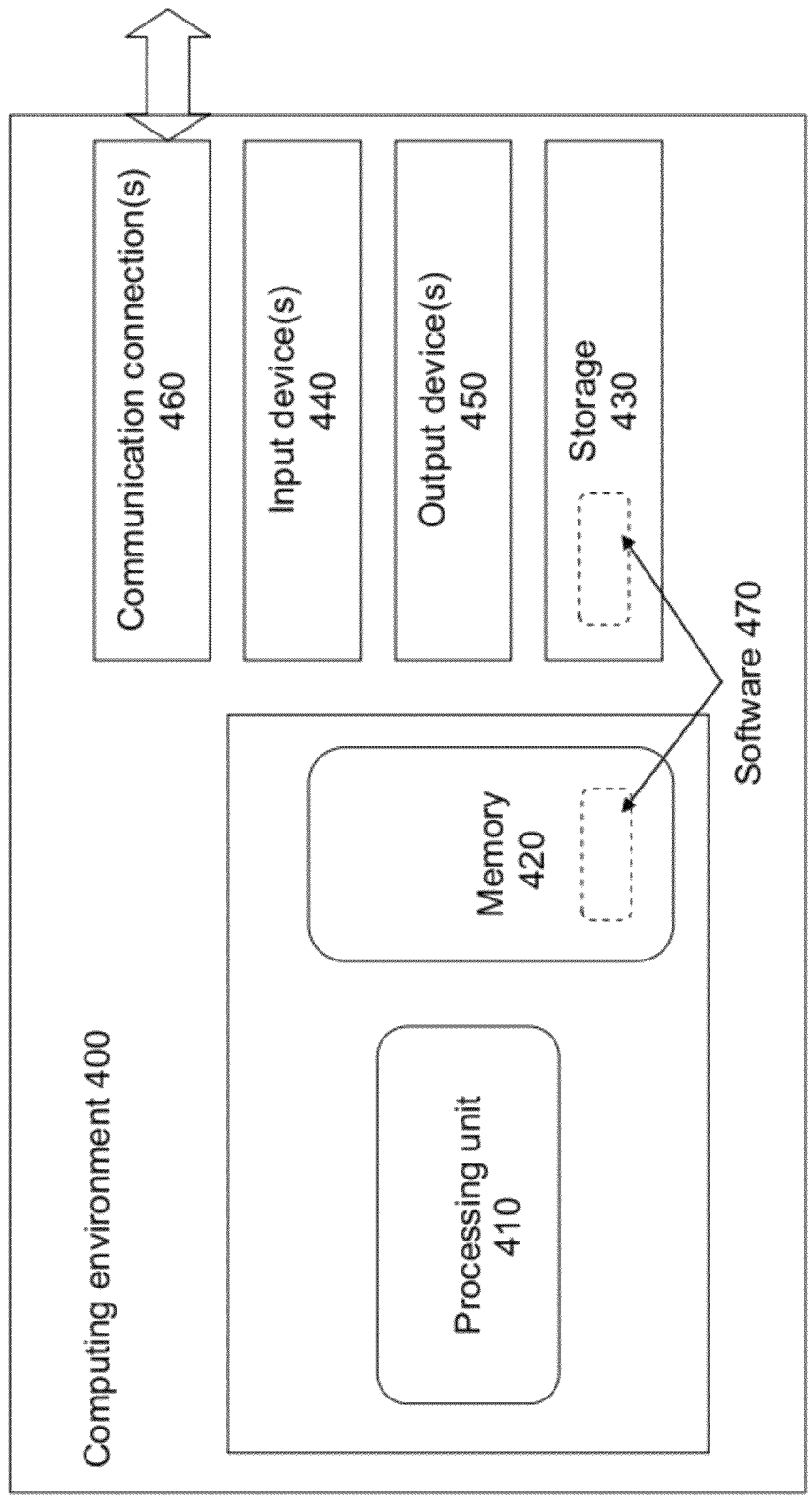
FIG. 4 shows a generalized computer network arrangement, in one embodiment of the present technique.

One or more of the above-described techniques may be implemented in or involve one or more computer systems. FIG. 4 shows a generalized example of a computing environment 400. The computing environment 400 is not intended to suggest any limitation as to scope of use or functionality of described embodiments.

With reference to FIG. 4, the computing environment 400 includes at least one processing unit 410 and memory 420. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In some embodiments, the memory 420 stores software 470 implementing described techniques.

A computing environment may have additional features. For example, the computing environment 400 includes storage 430, one or more input devices 440, one or more output devices 450, and one or more communication connections 460. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 430 may be removable or non-removable, and includes magnetic disks, magnetic tapes or cassettes, CD-ROMs, CD-RWs, DVDs, or any other medium which may be used to store information and which may be accessed within the computing environment 400. In some embodiments, the storage 430 stores instructions for the software 470.

The input device(s) 440 may be a touch input device such as a keyboard, mouse, pen, trackball, touch screen, or game controller, a voice input device, a scanning device, a digital camera, or another device that provides input to the computing environment 400. The output device(s) 450 may be a display, printer, speaker, or another device that provides output from the computing environment 400.

The communication connection(s) 460 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 400, computer-readable media include memory 420, storage 430, communication media, and combinations of any of the above.

Having described and illustrated the principles of our invention with reference to described embodiments, it will be recognized that the described embodiments may be modified in arrangement and detail without departing from such principles.

In view of the many possible embodiments to which the principles of our invention may be applied, we claim as our invention all such embodiments as may come within the scope and spirit of the claims and equivalents thereto.

While the present invention has been related in terms of the foregoing embodiments, those skilled in the art will recognize that the invention is not limited to the embodiments depicted. The present invention may be practiced with modification and alteration within the spirit and scope of the appended claims. Thus, the description is to be regarded as illustrative instead of restrictive on the present invention.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The detailed description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A computer implemented method executed by one or more computing devices to provide context-based listing services, the method comprising the steps of:

registering at least one merchant, by the one or more computing devices, with a service provider, wherein the registering comprises:

receiving information at the service provider via a communication network from the merchant, wherein the information comprises a geographic location of the merchant and/or a duration of availability of the category of service; and validating the information by the service provider, wherein the validating comprises identifying the geographic location of the merchant using a global positioning system (GPS), determining whether at least one predefined user is present in a vicinity of the identified geographic location via the GPS, requesting at least one predefined user located within the vicinity of the geographic location of the merchant to confirm the geographic location of the merchant to the service provider, and receiving confirmation of the geographic location of the merchant from the at least one predefined user;

receiving a request, by the one or more computing devices, at the service provider for the information via the communication network from at least one end user;

retrieving, by the one or more computing devices, the information requested by the at least one end user, wherein the retrieving comprises identifying a geographic location of the end user and/or at least one end user profile and/or the at least one category of service provided in the at least one service provider and/or the duration of availability of the at least one category of service and/or a feedback provided by at least one user; and receiving, by the one or more computing devices, a ranking of at the least one category of service at the service provider from the at least one end user so as to update the information provided to the service provider.

2. The method of claim 1, wherein the communication network comprises a voice channel and/or a message channel and/or a data channel.

3. The method of claim 1, wherein the end user profile comprises a name, an address, an income, and an age.

4. The method of claim 1, wherein the at least one predefined user agreed to a predefined agreement with the service provider.

5. The method of claim 4, wherein the at least one merchant sells goods.

6. The method of claim 5, wherein the communications network includes at least one interactive voice response and unstructured supplementary services data.

7. A system for providing context-based listing services, the system comprising:

a memory; and at least one processor operatively coupled to the memory, the at least one processor configured to perform the steps of:

registering at least one merchant, by one or more computing devices, with a service provider, wherein the registering comprises:

receiving information at the service provider via a communication network from the merchant, wherein the information comprises a geographic location of the merchant and/or a duration of availability of the category of service; and validating the information by the service provider, wherein the validating comprises identifying the geographic location of the merchant using a global positioning system (GPS), determining whether at least one predefined user is present in a vicinity of the identified geographic location via the GPS, requesting at least one predefined user located within the vicinity of the geographic location of the merchant to confirm the geographic location of the merchant to the service provider, and receiving confirmation of the geographic location of the merchant from the at least one predefined user;

receiving a request, by the one or more computing devices, at the service provider for the information via the communication network from at least one end user;

retrieving, by the one or more computing devices, the information requested by the at least one end user, wherein the retrieving comprises identifying a geographic location of the end user and/or at least one end user profile and/or the at least one category of service provided in the at least one service provider and/or the duration of availability of the at least one category of service and/or a feedback provided by at least one end user; and receiving, by the one or more computing devices, a ranking of the at least one category of service at the service provider from the at least one end user so as to update the information provided to the service provider.

8. The system of claim 7, wherein the communication network comprises a voice channel and/or a message channel and/or a data channel.

9. The system of claim 7, wherein the end user profile comprises a name, an address, an income, and an age.

10. The system of claim 7, wherein the at least one predefined user agreed to a predefined agreement with the service provider.

11. The system of claim 10, wherein the at least one merchant sells goods.

12. The system of claim 11, wherein the communications network includes at least one interactive voice response and unstructured supplementary services data.

13. Computer-readable code stored on a non-transitory computer-readable medium that, when executed by a computing device, performs a method for providing context-based listing services, the method comprising the steps of:

registering at least one merchant, by one or more computing devices, with a service provider, wherein the registering comprises:

receiving information at the service provider via a communication network from the merchant, wherein the information comprises a geographic location of the merchant and/or a duration of availability of the category of service; and validating the information by the service provider, wherein the validating comprises identifying the geographic location of the merchant using a global positioning system (GPS), determining whether at least one predefined user is present in a vicinity of the identified geographic location via the GPS, requesting at least one predefined user located within the vicinity of the geographic location of the merchant to confirm the geographic location of the merchant to the service provider, and receiving confirmation of the geographic of the merchant from the at least one predefined user;

receiving a request, by the one or more computing devices, at the service provider for the information via the communication network from at least one end user;

retrieving, by the one or more computing devices, the information requested by the at least one end user, wherein the retrieving comprises identifying a geographic location of the end user and/or at least one end user profile and/or the at least one category of service provided in the at least one service provider and/or the duration of availability of the at least one category of service and/or a feedback provided by at least one end user; and receiving, by the one or more computing devices, a ranking of the at least one category of service at the service provider from the at least one end user so as to update the information provided to the service provider.

14. The computer-readable medium of claim 13, wherein the communication network comprises a voice channel and/or a message channel and/or a data channel.

15. The computer-readable medium of claim 13, wherein the end user profile comprises a name, an address, an income, and an age.

16. The computer-readable medium of claim 13, wherein the at least one predefined user agreed to a predefined agreement with the service provider.

17. The computer-readable medium of claim 16, wherein the at least one merchant sells goods.

18. The computer-readable medium of claim 17, wherein the communications network includes at least one interactive voice response and unstructured supplementary services data.

* * * * *